United States Patent [19]

Brodie

[11] 4,257,528
[45] Mar. 24, 1981

[54] SAFETY PRESSURE RELIEF APPARATUS

[75] Inventor: George W. Brodie, Wellington, England

[73] Assignee: IMI Marston Limited, Staffordshire, England

[21] Appl. No.: 894,834

[22] Filed: Apr. 10, 1978

Related U.S. Application Data

[63] Continuation of Ser. No. 542,404, Jan. 20, 1975, abandoned.

[30] Foreign Application Priority Data

Feb. 6, 1974 [GB] United Kingdom ................. 5389/74

[51] Int. Cl.³ .............................................. F16K 17/40
[52] U.S. Cl. ............................... 220/89 A; 137/68 R
[58] Field of Search .................. 220/89 A; 137/67–71

[56] References Cited

U.S. PATENT DOCUMENTS

| 2,178,178 | 10/1939 | McKeever | 220/89 A |
| 2,437,836 | 3/1948 | Santiago | 220/89 A |
| 2,987,218 | 6/1961 | Erickson et al. | 220/89 A |
| 3,854,522 | 12/1974 | Didycz et al. | 137/68 R X |
| 3,901,259 | 8/1975 | Banbury | 137/68 R |

Primary Examiner—Martin P. Schwadron
Assistant Examiner—Richard Gerard
Attorney, Agent, or Firm—Cushman, Darby & Cushman

[57] ABSTRACT

A reverse buckling disc pressure relief venting apparatus in which the disc is held in position by an annular abutment against which the edge of the disc is forced when spreading under pressure and in which sealing is performed by means of a compressible seal acting between the disc and a support member for the disc.

10 Claims, 6 Drawing Figures

SAFETY PRESSURE RELIEF APPARATUS

This is a continuation of application Ser. No. 542,404 filed Jan. 20, 1975, now abandoned.

BACKGROUND OF THE INVENTION

This invention relates to safety pressure relief apparatus and has particular reference to such apparatus incorporating reverse buckling discs.

A reverse buckling pressure relief disc as referred to in this specification has a central portion which is convex on one side and concave on the other and which is held between two annular members around an edge region of the disc. In use, the pressure relief apparatus incorporating the disc and annular members is located upon a vessel with the convex side of the disc facing towards the interior of the vessel so as to be in direct contact with the fluid contained within the vessel. When the fluid pressure within the vessel reaches a predetermined limit, the disc reverses itself.

In known constructions of safety pressure relief apparatus incorporating reverse buckling pressure relief discs, cutting devices are provided on the outer side of the discs whereby when the discs are reversed, they become impaled on the cutting devices and are thus punctured so as to allow the fluid under pressure to escape from the vessel. These discs are normally referred to as reverse buckling pressure relief discs which are intended to rupture to permit fluid under pressure to escape. In an alternative form, there are devices in which the reverse buckling pressure relief disc is not intended to rupture by contacting a cutting device, but is intended to become reversed and then forced by fluid pressure to move from the position in which it is located so as to enable the fluid to escape from the vessel. In one construction, a reverse pressure relief disc of the latter construction is located in a pressure relief passage with the edge of the disc disposed against an annular shoulder which faces inwardly towards the interior of the pressure vessel. The edge of the disc is sealed against this shoulder by being soldered to it. The soldering operation is inconvenient to perform and it would be advantageous to avoid it.

In a further known construction, the reverse buckling disc is clamped between two planar parallel gripping surfaces and on reversing pulls free from the planar surfaces and permits the disc to be released.

SUMMARY OF THE INVENTION

By the present invention there is provided a safety pressure relief device comprising a pair of annular support members defining a gap of predetermined width, a reverse buckling disc having an annular edge region located in the gap, separate sealing and disc restraining means, the sealing means comprising a compressible sealing ring compressed to a predetermined amount between the edge region of the disc and one of the support members in the gap of predetermined width, and the disc restraining means including abutment means to restrain the disc when tending to radially spread, in use, under the influence of pressure, the arrangement being such that in the event of excess pressure being applied to the disc, it reverses, and at least part of the edge region is released from the sealing means.

The sealing ring may be an O-ring which may be located in a groove in one of the members. The support members may abut one another to define the predetermined gap. The support members may be bolted together.

The O-ring may be formed of neoprene or of polytetrafluoroethylene or of a silicone rubber, or of metal hollow tube O-ring.

There may be provided holding means to prevent the complete escape of the disc after it has relieved the pressure. The holding means may comprise an edge portion of the disc which is retained between or in contact with the support members. The edge portion may have a lip secured to at least one of the bolts. Alternatively, in those cases in which the disc is completely released, there may be a restriction such as a rod or grid disposed within the outlet from the relief device.

There may be a sealing means, preferably an O-ring between the two annular support members.

The device may be secured to a pressure vessel by holding means. The holding means may comprise a pair of flanges bolted together.

BRIEF DESCRIPTION OF THE DRAWINGS

By way of example, embodiments of the present invention will now be described with reference to the accompanying drawings of which.

DESCRIPTION OF THE PREFERRED EMBODIMENTS

Figure 1:
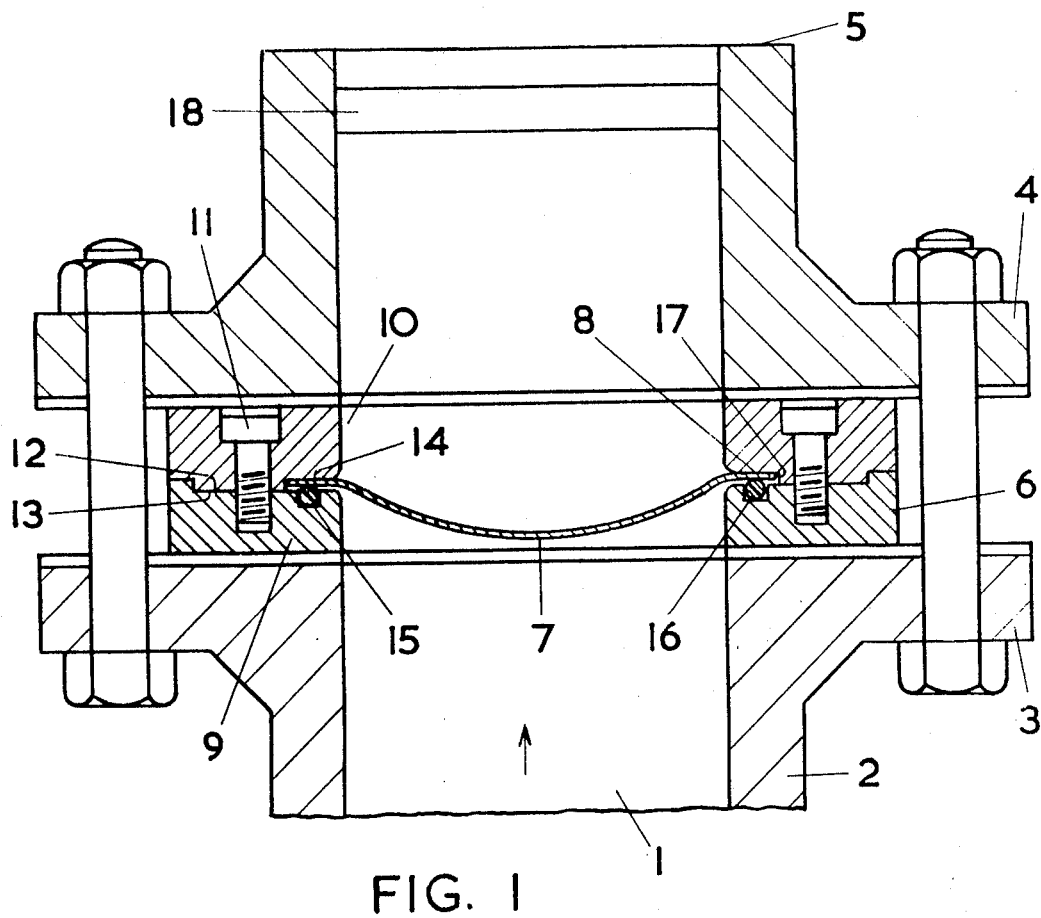
FIG. 1 is a cross-sectional view of a safety pressure relief apparatus installed on the outside of a vessel.

A vessel (not shown) comprises a fluid pressure relief outlet 1 confined within a pipe 3 having a flange 3. Between the flange 3 of the pipe and an opposing flange 4 of another pipe 5 is located a safety pressure relief apparatus 6, and the flanges 3 and 4 provide a holding means for the apparatus 6.

The apparatus 6 comprises a reverse buckling pressure relief disc 7 having its convex side inwardly directed towards the pressure vessel. The disc 7 is retained by an annular edge region 8 located between an inner annular support member 9 and an outer annular support member 10. The two support members are secured together by means of set screws 11 spaced around the support members. The support members have opposing faces 12 and 13 which abut one another to define a gap 14 of predetermined width in which the annular edge region of the disc 8 is located. A groove 15 contains an O-ring 16 which is of a thickness such that when the two annular support members are secured together in face to face relationship, the O-ring 16 is compressed to seal the pressure disc against egress of fluid in the normal operating conditions. The form of seal is shown more clearly in FIG. 2. When the disc is assembled, it can be seen that the pressure applied to the edge region of the disc is limited by virtue of the face to face contact of the faces 12 and 13 and thus the assembly can be manufactured so as to produce an arrangement in which the relief pressure is predetermined given the properties of the disc and O-ring seal. The assembly cannot be overtightened if assembled by unskilled labour since the face to face abutment of the two support members prevents this.

An outer annular edge 17 supports the outer edge of the pressure disc in normal operation in that pressure applied to the disc tends to spread the disc, causing the edge of the disc to abut the edge 17 and thus restrain the disc.

Pressure above that which the disc can withstand causes it to reverse and the restraint applied by the abutment 17 is then removed and the disc can be thrown clear of the apparatus. To catch the disc and prevent it from escaping completely, a grid device 18 may be used to hold the disc.

Figure 2:
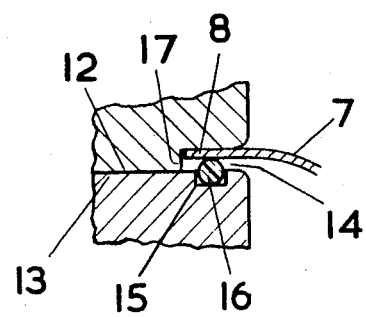
FIGS. 2 to 4 are partial cross-sectional views of alternative forms of sealing and gapping arrangements.
Figure 3:
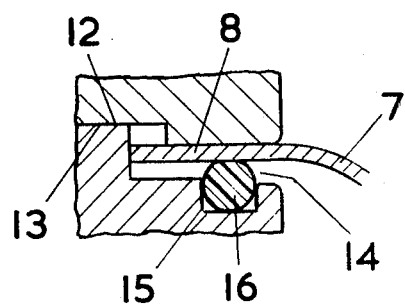

In the alternative arrangement ilustrated in FIG. 3, the mating faces 12 and 13 are arranged in a different manner to that shown in FIG. 2, but the arrangement is otherwise similar.

Figure 4:
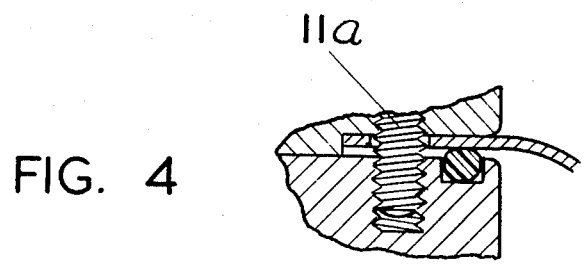

If required, one of the set screws may pass through the edge region of the disc, which can if necessary have an extension to accommodate the screw, as is shown in FIG. 4. The set screw 11a therefore holds the edge of the disc and if only one of these set screws is used, then one edge of the disc will be held after reversal and release, thus retaining the disc in the apparatus.

Figure 5:
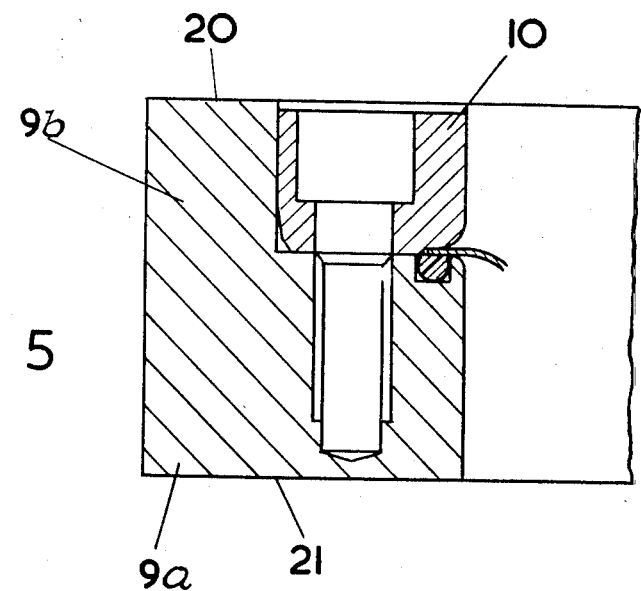
FIG. 5 is a partial cross-sectional view of a further alternative sealing, gapping and spacing arrangement.
Figure 6:
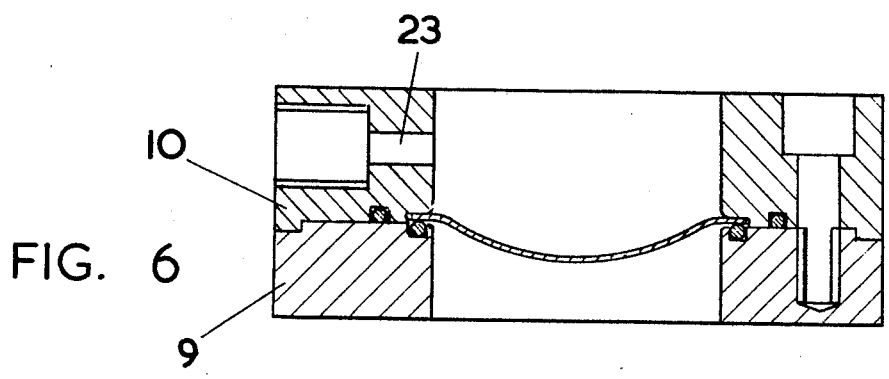
FIG. 6 is a cross-sectional view of a further alternative form of the invention.

In certain circumstances, the bursting disc does not vent to atmosphere. The disc may vent to a chamber which has a pressure relief valve for venting material to a sump or to atmosphere. The material being vented may be toxic, in which case it is important to prevent it escaping to the atmosphere and it will be appreciated that the material will still be under some pressure against the pressure relief valve. The disc may also be used to prevent contaminating material contaminating the pressure relief valve and hence preventing it from working. In the arrangements in which it is necessary to prevent toxic material escaping, the arrangement illustrated in FIG. 1 may not be sufficiently fluid-tight in that a part for the escape of fluid could exist between the two annular members 9 and 10. One method of overcoming this is illustrated in FIG. 5 in which the lower annular member 9a has an outer upwardly directed flange 9b which encompasses the upper member 10 and enables positive sealing to occur between the faces 20 and 21. Alternatively,the arrangement illustrated in FIG. 6 may be used in which there is provided a further O-ring seal 22 to seal the two annular members 9 and 10 together. There may be provided a tapped hole 23 to register the change in pressure which occurs when the bursting disc is released.

The compressible ring has been described specifically as an O-ring; however, it could have a square cross-section although O-rings are preferable because of their availability and because they are distorted by the pressure normally acting upon them to compress between the disc and the abutment of the recess containing them to enhance the sealing effect so that greater pressures give greater sealing.

The O-ring material may be neoprene or any other suitable material resistant to the fluids contained within the vessel, such as a hollow annular metal ring or a metal ring having a slot around its side and containing a metal spring. The pressure at which the disc reverses is principally determined by the shape and amount of concavity of the disc, the material of the disc and its heat treatment, and also by the amount which it is permitted to spread by the abutment 17. A very concave disc with little room to spread will require a greater bursting pressure than a disc having less concavity or having more room to spread.

I claim:

1. A safety pressure relief device comprising a pair of annular support members fixed in contact with each other by clamping means and defining between portions of the members a gap of predetermined width, a reverse buckling disc having an annular edge region located in the gap, separate sealing and disc restraining means, the sealing means comprising a compressible sealing ring of O-cross section located in a groove in the gap-determining portion of one of the support members, said sealing ring being compressed to a predetermined amount between the edge region of the disc and the groove and the disc restraining means including abutment means on one of the support members to restrain the disc when tending to radially spread, in use, under the influence of pressure, the arrangement being such that in the event of excess pressure being applied to the disc, it reverses, and at least part of the edge region is released from the sealing means.

2. A device as claimed in claim 1 in which the support members abut one another to define the predetermined gap.

3. A device as claimed in claim 1 in which there is, in addition to said compressible sealing ring, an O-ring between the two annular support members.

4. A device as claimed in claim 1 including holding means to prevent the complete escape of the disc after it has relieved the pressure.

5. A device as claimed in claim 4 in which the holding means comprises an edge portion of the disc which is retained between or in contact with the support members.

6. A device as claimed in claim 5 in which the support members are bolted together and the edge portion has a lip secured to at least one of the bolts.

7. A device as claimed in claim 1 in which the O-ring is formed from a material chosen from the group neoprene, polytetrafluoroethylene, silicone rubber, or a hollow metal tube.

8. A device as claimed in claim 1 including a pair of flanges adapted to hold the device to a pressure vessel.

9. A safety pressure relief device as claimed in claim 1 wherein the abutment means contacts the annular edge region of the reverse buckling disc.

10. A safety pressure relief device comprising a pair of coaxial annular support members having mutually abutting surfaces, means clamping said support members together and maintaining said abutting surfaces in contact with each other, said support members also having annular surfaces which are axially fixed in spaced apart positions by the engagement of the abutting surfaces so as to define a gap of predetermined axial width which is independent of the clamping force applied by the clamping means, a reverse buckling disc having an annular edge region located in the gap, separate sealing and disc restraining means, the sealing means comprising a compressible sealing ring of O-cross section located in a groove in the gap-determining portion of one of the support members, said sealing ring being compressed to a predetermined amount between the edge region of the disc and the groove and the disc restraining means including abutment means on one of the support members to restrain the disc when tending to radially spread, in use, under the influence of pressure, the arrangement being such that in the event of excess pressure being applied to the disc, it reverses, and at least part of the edge region is released from the sealing means.

* * * * *